United States Patent
Landberg et al.

(10) Patent No.: US 6,965,607 B1
(45) Date of Patent: Nov. 15, 2005

(54) ACCESS CONTROL MECHANISM FOR PACKET SWITCHED COMMUNICATION NETWORKS

(75) Inventors: Christer Landberg, Huddinge (SE); Lars Olgus, Skärholmen (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 09/857,288

(22) PCT Filed: Dec. 1, 1999

(86) PCT No.: PCT/SE99/02244

§ 371 (c)(1),
(2), (4) Date: Oct. 1, 2001

(87) PCT Pub. No.: WO00/33609

PCT Pub. Date: Jun. 8, 2000

(30) Foreign Application Priority Data

Dec. 1, 1998 (SE) .................................. 9804172

(51) Int. Cl.[7] ............................. H04B 7/212; H04J 3/16
(52) U.S. Cl. ...................................... 370/442; 370/468
(58) Field of Search ........................ 370/229, 336–337, 370/345, 400, 401, 458, 412, 465, 468, 470, 370/473, 442, 447, 449

(56) References Cited

U.S. PATENT DOCUMENTS

| | | | |
|---|---|---|---|
| 5,297,144 A | | 3/1994 | Gilbert et al. |
| 5,327,432 A | | 7/1994 | Zein Al Abedeen et al. |
| 5,590,131 A | * | 12/1996 | Kabatepe .................... 370/461 |
| 5,677,909 A | | 10/1997 | Heide |
| 5,754,535 A | * | 5/1998 | Vandenabeele et al. ..... 370/321 |
| 5,896,382 A | * | 4/1999 | Davis et al. ................ 370/401 |
| 5,960,001 A | * | 9/1999 | Shaffer et al. .............. 370/448 |
| 6,034,960 A | * | 3/2000 | Beshai et al. ............... 370/412 |
| 6,205,118 B1 | * | 3/2001 | Rathnavelu ................. 370/229 |
| 6,545,996 B1 | * | 4/2003 | Falco et al. ................ 370/347 |

FOREIGN PATENT DOCUMENTS

| WO | WO 98/44758 | 10/1998 |
|---|---|---|
| WO | WO 98/54858 | 12/1998 |

* cited by examiner

*Primary Examiner*—Andy Lee
(74) *Attorney, Agent, or Firm*—Young & Thompson

(57) ABSTRACT

In a point-to-multipoint link traffic is transmitted in packets across the shared medium. Access to the medium is controlled by permits sent by a central node to multipoint nodes in response to a queue record of the number of packets awaiting transmission at the multipoint nodes. When circuit emulated traffic, or traffic with tight delay and delay variation requirements, is to be sent across the link, permits are sent by the central node unsolicited at regular intervals in accordance with information stored in a scheduler. The scheduler may be a single or several circular memories comprising cells representing time slots on the link. The cells contain scheduling information corresponding to one or more multipoint nodes. The central node consults the scheduler to determine if a permit is scheduled. If no permit is scheduled the time slot may be allocated to an unscheduled service on the basis of a queue record.

13 Claims, 2 Drawing Sheets

ACCESS CONTROL MECHANISM FOR PACKET SWITCHED COMMUNICATION NETWORKS

FIELD OF INVENTION

The invention relates to media access control (MAC) over a shared multiplexed link using packet transmission. It is particularly directed to the management of the transfer of information from services which stipulate certain delays and delay variations, such as circuit emulated traffic, in a packet switched network, and specifically between a central node and one of several multipoint nodes over a shared medium.

BACKGROUND ART

Media access control (MAC) in a packet switched network is a mechanism for determining which of a plurality of nodes is allowed to send information over a shared medium. In a point-to-multipoint configuration it is common that the head end or central node in a shared link will control the utilisation of the link by multipoint nodes. This is achieved by polling the various multipoint nodes. The polling order and frequency is generally controlled according to traffic demand. In a time division multiplexed TDM link, time slots are allocated by the head end of a link in response to requests sent by the multipoint nodes when traffic is awaiting transmission at these node. The slots are allocated using permits that designate which time slot in the future traffic stream may be utilised for which service traffic. When more traffic is waiting than there are available time slots, the central node will issue queuing and prioritising requests to determine which service should be allocated channel capacity first, and which can wait.

Packet switched networks are increasingly utilised to transport a variety of traffic, some of which is traditionally circuit switched. An example of this is the transmission of voice over an internet protocol (IP) based network. While speech information may be packetised, certain transmission delays and delay variations must be respected if the speech service is to be acceptable to the end user. This is a general requirement of all circuit emulated traffic. Accordingly, with the above-described request based protocols, a multipoint node carrying circuit emulated traffic requires permits to be allocated without delay and with high priority. When more than one delay sensitive service utilises the shared medium the access control becomes more complex. This situation is made still more difficult when the delay sensitive services use different frame lengths and possibly also different bit rates so that intervals between the required high priority permits are always changing. The result is often excessive delays in one or more of the delay sensitive services leading to the end user experiencing an unacceptable quality of service.

SUMMARY OF INVENTION

It is therefore an object of the invention to provide a method and arrangement enabling the efficient handling of hybrid traffic over a shared multiplexed link.

It is a further object of the present invention to provide a method and arrangement enabling the handling of several delay sensitive services over a shared medium in a packet switched network.

These and further objects are achieved in a method and arrangement for controlling access to a central node over shared medium by one of several network nodes carrying both delay sensitive and non-delay sensitive traffic, by providing a scheduler that defines a predetermined scheduling interval for the delay sensitive traffic services. The scheduling interval corresponding essentially to the time in terms of time slots for assembling a data packet of the delay sensitive traffic service. Prior to allocating a time slot, the central node consults the scheduler to determine if a scheduling interval has elapsed. If an interval has elapsed, a time slot is allocating to the network node carrying the corresponding delay sensitive traffic service. If no scheduling interval has elapsed for the time slot consulted, the central node allocates a time slot to a non-delay sensitive service on the basis of stored information concerning the amount of traffic awaiting transmission at the various network nodes.

The scheduler is a cyclical storage means that is divided into cells representing a time slot on the shared medium and adapted to contain scheduling information relating to the traffic service.

The scheduler may comprise scheduling information for several services in a single cyclical storage means. Alternatively the scheduler contains several separate, cyclical schedulers arranged in a queue, and each being dedicated to a single traffic service.

With this method and arrangement, the transmission efficiency across the shared link can be substantially improved because no exchange of queue information is necessary for the scheduled services. Furthermore, the delays and delay variations experienced by circuit emulated and other delay sensitive traffic can be kept at a minimum. By using multiple cyclical storage means, one dedicated to each service, both the implementation of the scheduler and its expansion to accommodate additional delay sensitive services is rendered exceptionally simple.

BRIEF DESCRIPTION OF THE DRAWINGS

Further objects and advantages of the present invention will become apparent from the following description of the preferred embodiments that are given by way of example with reference to the accompanying drawings, in which.

DETAILED DESCRIPTION OF THE DRAWINGS

Figure 1:
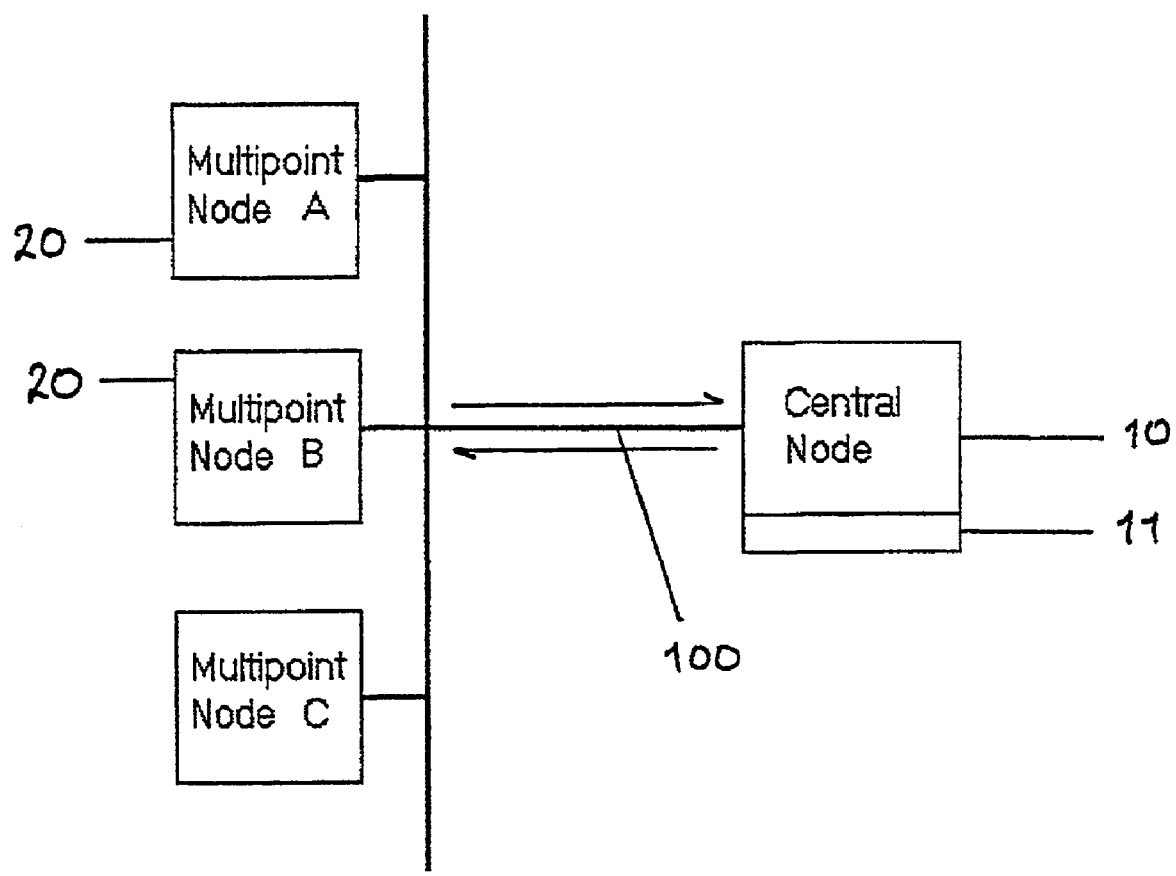
FIG. 1 schematically depicts a point to multipoint link of a multiplexed packet switched network.

A typical multipoint-to-point link in a TDMA packet switched communication network is illustrated in FIG. I Several multipoint nodes 20 communicate via a single, shared bi-directional channel with a central node 10. Only three nodes are shown in the figure, however it is to be understood that further nodes may be connected above and below the illustrated nodes. The channel 100 may be a fixed electrical or electro-optical link or an air interface.

As in many conventional media access control (MAC) protocols, the central node 10 determines which time slots on the shared channel 100 will be allocated to which services conveyed by the multipoint nodes 20. This is accomplished by the central node 10 issuing permits for a time slot in the future information stream.

For delay insensitive packet switched services, such as data transmission services, the central node 10 holds a record of the number of packets of information awaiting transmission at each of the multipoint nodes 20. This is represented in the figure by a queue record memory 11. The queue records are updated by means of permit requests, or equivalent queue size reports, sent by the multipoint nodes 20 to the central node 10. When the record of a particular multipoint node 20 indicates that packets are awaiting transmission, the central node 10 issues a corresponding permit defining which time slot the multipoint node 20 in question may utilise for transmitting the packet. When more packets are awaiting transmission than can be dealt with immediately, the central node 10 determines which service has priority. This prioritising information is likewise obtained from the multipoint nodes 20 on invitation from the central node 10.

In the present example, however, it is assumed that the traffic A, B, C conveyed by the three illustrated multipoint nodes 20 is delay sensitive, i.e. has strict requirements as to allowable delays and delay variations. This may include, but is not limited to, circuit emulated traffic, voice or interactive video traffic. Furthermore, each service A, B, C has different frame lengths. In accordance with the present invention, these services are not handled in the same way as delay insensitive services. While the central node 10 issues permits to the services A, B, C, these are not issued in response to information obtained from the multipoint nodes 20, but are instead scheduled by the central node 10 at regular intervals. In other words, no exchange of information takes place between the nodes. The issuing of permits is unsolicited. This is performed in accordance with the present invention with the aid of a scheduler.

Figure 2:
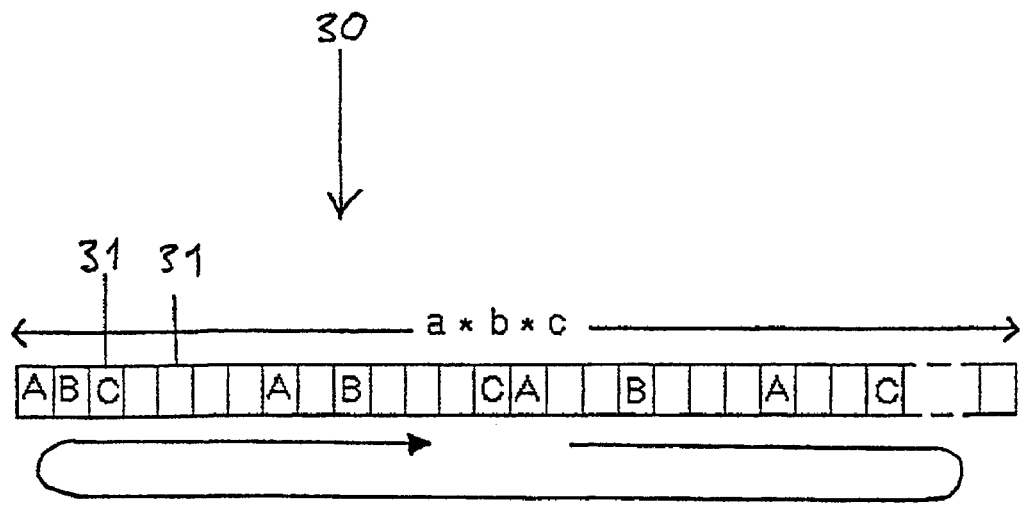
FIG. 2 shows a first embodiment of a scheduler according to the invention.

FIG. 2 shows a scheduler 30 according to a first embodiment of the invention. The scheduler 30 can he viewed as a circular memory divided into cells 31, each of which represents a time slot on the shared channel. It will be understood, however, that the scheduler 30 may be implemented using one or more modulo counters, memories or registers with pointers, or similar means which allow information to be obtained at predetermined regular intervals. The scheduler 30 is either incorporated in the central node 10 or is arranged such that a controller of the central node 10 (not shown) that is adapted to handle the allocation of time slots across the shared link can easily access the scheduler 30.

Prior to operation, or upon the introduction of a new delay sensitive service, the scheduler 30 is programmed. This may be done by the central node 10 using its controller, or may be performed using external means. The scheduler 30 in FIG. 2 is already programmed with markers in some of the cells 31 that serve to indicate which service is to be allocated a permit for which time slot in the future traffic stream. In the present example these markers are represented by the letters A, B and C for the three delay sensitive services of the same names, respectively. The scheduler 30 does not define the slot as an absolute time, but rather the slot interval. The different services, A, B and C, have different frame formats and lengths determined by the transmission bit rate and denoted in the figure by a, b and c, respectively. In the figure, the frame length a of the service A is given as the equivalent of 7 time slots on the shared channel; the frame length b of service B is 8 time slots, and the frame length c of the service C is 11 time slots. In order that the permit intervals for each of these services can be respected, the total length of the scheduler 30 is a multiple of all the frame lengths in terms of time slots. While the scheduler 30 illustrated in FIG. 2 is somewhat truncated, it is assumed to have a length equal to the smallest multiple of a, b and c, that is 616 cells 31. It will be understood that the permit intervals between different services will also take account of possible path delay differences between the various multipoint nodes 20 and the central node 10.

In operation, the central node 10, or its controller, consults the cells 31 of scheduler 30 in succession to determine whether a permit is scheduled for one of the services A, B or C for each time slot. If the cell 31 consulted is marked, a permit will be issued to the corresponding multipoint node 20 carrying the selected service. If no permit is scheduled for a particular time slot, the central node 10 may issue a permit to one of the other delay insensitive services which require access to the shared medium on the basis of queue size information stored at the node 10, as described above. Once all the cells 31 of the scheduler 30 have been consulted in turn, the pointer or its equivalent returns to the beginning again.

It will be apparent that when services with different frame formats and lengths are to be scheduled at predetermined constant intervals over the same link, there will be incidences when permits for two or more different services will be scheduled in the same time slot. In this case, the central node 10, or rather its controller, will allocate the time slot to one of the services and cause the frames for the remaining services to be delayed by one or more time slots. The allocation of time slots for conflicting permit schedules may be decided on the basis of prioritising information relating to the services, whereby one service will consistently be handled before the others. Alternatively, the central node 10 may treat all services with equal priority by giving one service priority in the first incidence of conflict and another service priority in the next incidence. Alternatively, the scheduler 30 could be programmed such that only one permit is allocated to each cell, however this would necessarily introduce a firm priority for one or other of the services.

The scheduler 30 described with reference to FIG. 2 can deal efficiently with the access of circuit emulated delay sensitive traffic over a shared link of a packet switched network when the number of services with different frame lengths is not too high. However, when several different services, many with different frame lengths are to be scheduled on a shared medium, the length of the scheduler will become prohibitively large. Furthermore the scheduler 30 of FIG. 2 does not lend itself easily to expansion. It is complex to incorporate additional services, since new permit schedules will effect both the total length and the content of the scheduler 30.

Figure 3:
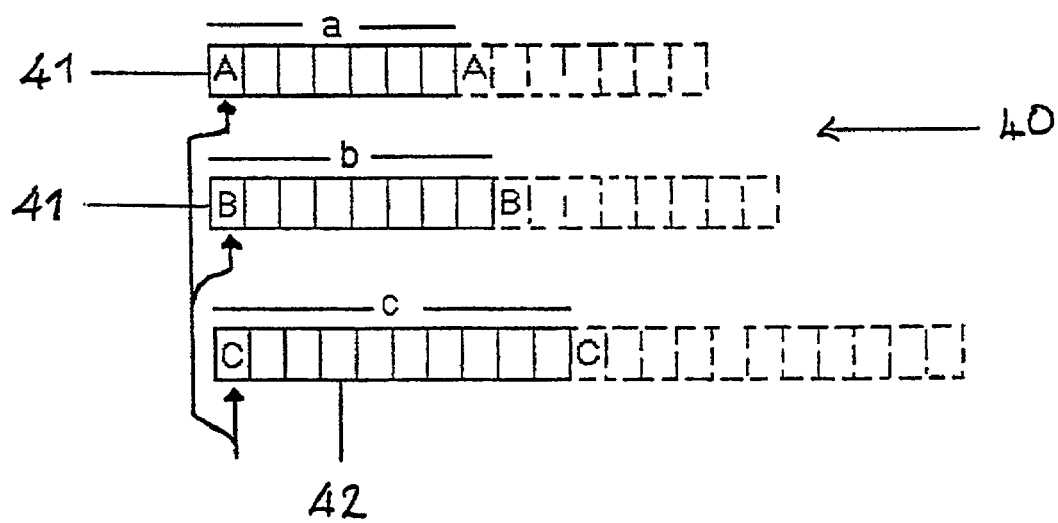
FIG. 3 shows a further embodiment of a scheduler according to the invention.

This problem is overcome by the scheduler 40 illustrated in FIG. 3 according to a second embodiment of the invention.

In place of the single circular memory of the first embodiment of the invention, this scheduler 40 includes several short schedule memories 41 arranged in a queue. Each schedule memory 41 contains information for services having the same frame format and length. In FIG. 3 the topmost schedule memory 41 contains scheduling information for the service A, the next schedule memory 41 in descending order contains information relating to service B, and the final schedule memory 41 contains permit scheduling information for service C. The maximum length required for this scheduler is thus a+b+c cells 42. Furthermore, since several services could be scheduled using each single queue, provided they have the same frame length the total length of the scheduler will not change. The cells 42 of each schedule memory 41 represent coincident time slots. As indicated by the arrows in FIG. 3, the central node 10, or its controller, thus consults the cells 42 of each of the schedule memories 41 representing the current time slot in turn, and determines which, if any, of the services is to be sent a permit for the specified time slot.

As for the scheduler structure 30 of the first embodiment, some conflict is inevitable between the scheduled permits. Accordingly, when permit allocation markers are present in more than one cell 42 representing the current time slot, the central node controller will decide which service will be handled preferentially. This is done on the basis of prioritising information obtained previously from the corresponding multipoint nodes 20. Alternatively, when no service is defined as having priority, or all services stipulate similar delays and delay variations to be respected, priority will be allocated by the central node controller to each service in turn as each conflict arises. Also, as for the previous embodiment, the schedule memories 40 may be programmed with a specified priority hierarchy causing some services to be consistently delayed in favour of another so that decisions do not need to be made by the central node 10, or its controller.

The scheduling of the transmission of some delay sensitive services over a shared link in a packet switched network in the manner described above can lead to good efficiency and allow the delays and delay variations to be kept small. However, the delays and delay variations can be reduced still further if the scheduling of a service is arranged to correspond with the assembly of cells. Circuit emulated traffic transmitted over a packet switched network may use only part of a cell for traffic information so as to reduce the time needed for assembly of the cell. For example, to reduce the time needed to assemble an ATM cell for a 64 kbps telephone service, the ATM cell may contain only 24 bytes of traffic information with the 24 remaining bytes being filled with dummy data. The delay experienced by this service can be substantially reduced, when the scheduling of packet transmission using the scheduler 30, 40 described above is synchronised to coincide with the assembly of the cell after the arrival of 24 bytes of information. Furthermore, the permits may be scheduled to prevent time slots being wasted on the transmission of idle or dummy cells or cell portions.

What is claimed is:

1. A packet switched communication network comprising a central node (10) and a plurality of network nodes (20) connected to said central node by a shared medium (100), wherein, traffic data is transmitted from said network nodes to said central node over said shared medium in time slots allocated by said central node, said central node including scheduling means (30, 40) for allocating permits to a service carried by at least one network node, said scheduling means includes a plurality of sequentially accessible storage cells (31, 42) each cell corresponding to a transmission time slot on said shared medium and being programmed with markers corresponding to delay sensitive traffic services, the number of sequentially accessible cells separating a marker for the same traffic service defines a predetermined scheduling interval essentially corresponding to the frame length of the traffic service in terms of time slots, and said central node is arranged to consult said storage cells in succession to determine whether a marker designating a delay sensitive traffic service is present and for allocating a time slot to a network node carrying a delay sensitive traffic service if a marker corresponding to said traffic service is present in a consulted cell.

2. A network as claimed in claim 1, wherein, said central node further comprises queue recording means (11) for storing the packet queue size of non-delay sensitive traffic awaiting transmission at said network nodes, and said central node is adapted to issue a permit to a non-delay sensitive traffic service on the basis of said queue record when no marker is present in a consulted cell of said storage means.

3. A network as claimed in claim 1, wherein, said scheduling means (31, 42) is arranged to be accessed cyclically.

4. A network as claimed in claim 1, wherein, the number of cells included in said scheduling means (30) is at least equal to the multiple of different frame lengths in terms of time slots of the scheduled traffic.

5. A network as claimed in claim 1, wherein, said scheduling means (40) comprises several cyclical schedulers (41), and each cyclical scheduler is programmed with scheduling markers relating to traffic services having the same scheduling interval in terms of time slots, the cells of each scheduler that correspond to the same time slot being accessible in turn.

6. A network as claimed in claim 5, wherein, each scheduler has a length in cells (42) that is equal to the scheduling interval in terms of time slots of the scheduled traffic services.

7. A network as claimed in claim 5, wherein, said central node is arranged to issue a permit to more than delay sensitive traffic service in succession when said central node determines that markers for more than one delay sensitive traffic services are present in the cell (42) corresponding to the same time slot in more than one scheduler (41).

8. A node in a packet switched communication network for controlling the transmission of data packets from a plurality of network nodes (20) over a shared medium (100) by allocating transmission time slots to said network nodes, said node comprising:

scheduling means (30, 40) for allocating permits to a service carried by at least one network node, wherein, said scheduling means includes a plurality of sequentially accessible storage cells (31, 42) each cell corresponding to a transmission time slot on said shared medium and being programmed with markers corresponding to delay sensitive traffic services, the number of sequentially accessible cells separating a marker for the same traffic service defines a predetermined scheduling interval essentially corresponding to the frame length of the traffic service in terms of time slots, and a controller arranged to consult said storage cells in succession to determine whether a marker designating a delay sensitive traffic service is present, and for allocating a time slot to a network node carrying a delay sensitive traffic service if a marker corresponding to said traffic service is present in a consulted cell.

9. A node as claimed in claim 8, further comprising:

queue recording means (11) for storing the packet queue size of non-delay sensitive traffic awaiting transmission at said network nodes (20), wherein said node is adapted to issue a permit to a non-delay sensitive traffic service on the basis of said queue record when no marker is present in a consulted cell of said storage means.

10. A node as claimed in claim 8, wherein,
said storage cells (31, 42) are arranged to be accessed cyclically.

11. A node as claimed in claim 8, wherein,
the number of cells included in said scheduling means (30) is at least equal to the multiple of different frame lengths in terms of time slots of the scheduled traffic.

12. A node as claimed in claim 8, wherein,
said scheduling means (40) comprises several cyclical schedulers (41), wherein each cyclical scheduler is programmed with scheduling markers relating to traffic services having the same scheduling interval in terms of time slots, the cells of each scheduler that correspond to the same time slot being accessible in turn.

13. A node as claimed in claim 12, wherein,
each scheduler (41) has a length in cells (42) that is equal to the scheduling interval in terms of time slots of the scheduled traffic services.

* * * * *